(No Model.) 13 Sheets—Sheet 2.

J. A. NORMAND & P. SIGAUDY.
MULTITUBULAR STEAM GENERATOR.

No. 548,451. Patented Oct. 22, 1895.

Fig 1ᵃ

Witnesses
Geo. W. Rea.
Robert Emmett

Inventors
Jacques A. Normand.
Pierre Sigaudy.
By James L. Norris
Atty.

(No Model.) 13 Sheets—Sheet 3.
J. A. NORMAND & P. SIGAUDY.
MULTITUBULAR STEAM GENERATOR.

No. 548,451. Patented Oct. 22, 1895.

FIG 2

Witnesses
Geo. W. Rea.

Inventors
Jacques A. Normand.
Pierre Sigaudy.
By James L. Norris
Atty.

(No Model.) 13 Sheets—Sheet 4.

J. A. NORMAND & P. SIGAUDY
MULTITUBULAR STEAM GENERATOR.

No. 548,451. Patented Oct. 22, 1895.

FIG.3

Witnesses
Gro. W. Rea.
Rhat Ernett.

Inventors.
Jacques A. Normand,
Pierre Sigaudy
By James L. Norris
Atty.

(No Model.) 13 Sheets—Sheet 5.

J. A. NORMAND & P. SIGAUDY.
MULTITUBULAR STEAM GENERATOR.

No. 548,451. Patented Oct. 22, 1895.

FIG 4

Witnesses
Geo. W. Rea
Robert Everett

Inventors.
Jacques A. Normand
Pierre Sigaudy
By James L. Norris
Atty.

(No Model.) 13 Sheets—Sheet 6.
J. A. NORMAND & P. SIGAUDY.
MULTITUBULAR STEAM GENERATOR.

No. 548,451. Patented Oct. 22, 1895.

FIG 5

Witnesses
Geo. W. Rea.
Robert Ernutt

Inventors,
Jacques A. Normand.
Pierre Sigaudy.
By James L. Norris
Atty.

(No Model.) 13 Sheets—Sheet 7.
J. A. NORMAND & P. SIGAUDY.
MULTITUBULAR STEAM GENERATOR.

No. 548,451. Patented Oct. 22, 1895.

(No Model.) 13 Sheets—Sheet 8.
J. A. NORMAND & P. SIGAUDY.
MULTITUBULAR STEAM GENERATOR.

No. 548,451. Patented Oct. 22, 1895.

(No Model.) 13 Sheets—Sheet 10.
J. A. NORMAND & P. SIGAUDY.
MULTITUBULAR STEAM GENERATOR.

No. 548,451. Patented Oct. 22, 1895.

FIG. 9

Witnesses
Geo. W. Rea
Robert Emett

Inventors
Jacques A. Normand
Pierre Sigaudy
By James L. Norris
Atty.

(No Model.) 13 Sheets—Sheet 13.
J. A. NORMAND & P. SIGAUDY.
MULTITUBULAR STEAM GENERATOR.

No. 548,451. Patented Oct. 22, 1895.

FIG. 11

Witnesses
Geo. W. Rea.
Robert Emett

Inventors
Jacques A. Normand.
Pierre Sigaudy
By James L. Norris
Atty.

UNITED STATES PATENT OFFICE.

JACQUES AUGUSTIN NORMAND AND PIERRE SIGAUDY, OF HAVRE, FRANCE.

MULTITUBULAR STEAM-GENERATOR.

SPECIFICATION forming part of Letters Patent No. 548,451, dated October 22, 1895.

Application filed March 28, 1895. Serial No. 643,564. (No model.)

*To all whom it may concern:*

Be it known that we, JACQUES AUGUSTIN NORMAND and PIERRE SIGAUDY, citizens of France, and residents of Havre, in the Department of the Seine-Inférieure, France, have invented a new and useful Improvement in Multitubular Steam-Generators, of which the following is a specification.

The lightness of multitubular steam-generators in which water circulates through the tubes is chiefly due to the small volume of water which the said generators contain. In multitubular steam-generators so constructed, however, in particular in the marine type, variations in pressure are very considerable, so that when several generators are coupled together for supplying steam to one engine the regular distribution of the feed-water to the different boilers gives place to serious difficulties, since the water has a tendency to enter the boilers where the pressure is lowest and where the discharge is consequently the smallest. It would, therefore, seem useful to diminish as much as possible the number of generators thus coupled together, since the work and supervision which a regular distribution demands would be diminished in like proportion. There are, moreover, advantages gained by the use of coupled generators, more especially in respect of the pipes, the cocks, and valves, the reduction of temperature of the compartments, and the spaces occupied by the generators, which in the case where several generators are in use outweigh the disadvantages, such as that two generators instead of one become unavailable in the case of damage and that there is a greater variation of the level of the water at the ends of the upper reservoir, which is caused in the case of marine boilers by the motion of the sea and the variations in the trim of the boat.

Steam-generators of the Normand type present the following characteristics: lightness in construction, high efficiency, and capability of supporting without danger a very intense firing.

This invention has for its object to facilitate the application of steam-generators of the class we have described to the most powerful engines by duplicating the heating and grate surfaces in the two well-known types of these generators, the first type being that in which the chimney is situated at the end of the generator opposite to the front part thereof, and the second in which the gases are caused to return to the chimney, which is situated near the front of the generator. Under these new conditions steam-generators of the Normand type may be used with great advantage on very high-speed large steamers and cruisers.

The accompanying drawings illustrate, by way of example, tubular steam-generators constructed according to this invention, Figures 1, 1$^a$, 2, and 3 relating to the first type of a Normand steam-generator.

A A' are the front ends of the boilers, which are coupled together so as to form a single steam-generator.

B B' are the two side cylindrical vessels, into which the lower ends of the water-tubes open, while the upper ends of the said tubes from each lateral receiver terminate in the upper central reservoir C.

D D' are bridges situated at the end of the grates.

E E' E$^2$ E$^3$ indicate the return-water tubes situated outside the fire.

Hollow tie-rods F F' F$^2$ F$^3$, containing water, connect the upper and lower collectors or receivers in the central part of the generator.

G G' are inverted bridges under which the heated gases pass, as shown by the arrows, before entering the smoke-box. A plate H divides the said smoke-box into two parts, and extending upwardly into the chimney separates the currents of gas from the two halves of the combined generator whatever be the difference of the pressures of the air or of the draft in the two heating-chambers. The chimney I is made common to the two united generators.

Figure 1:
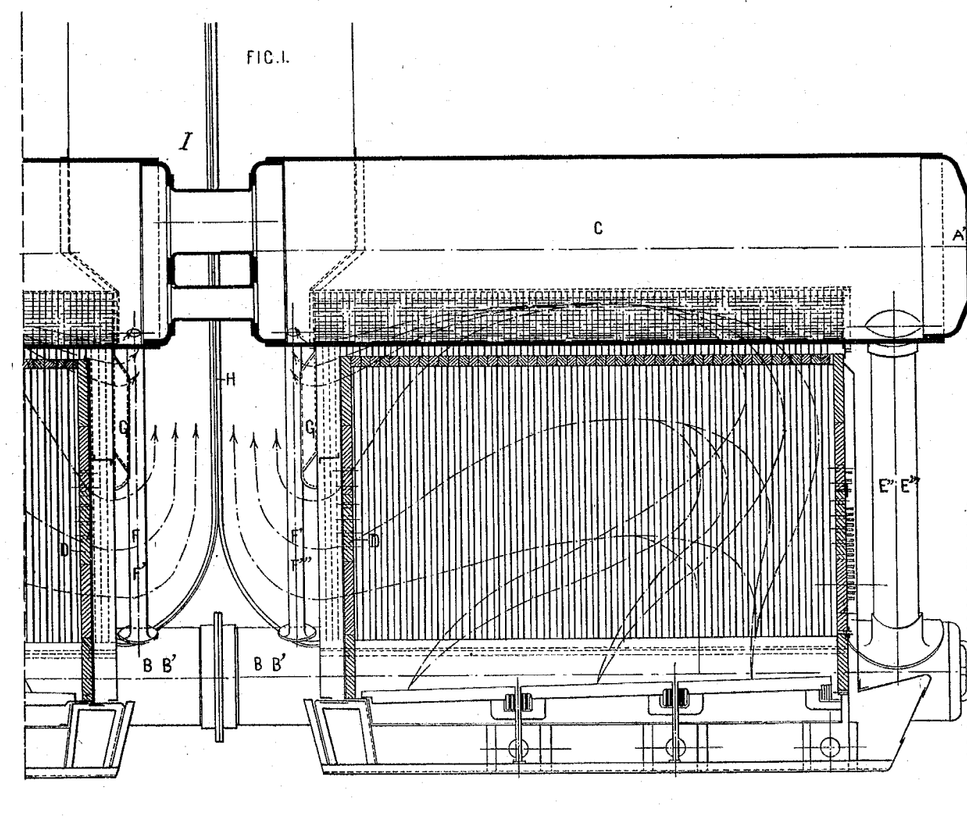
Figs. 1 and 1$^a$ are a vertical longitudinal section of the steam-generator, taken along the axis thereof.
Figure 1A:
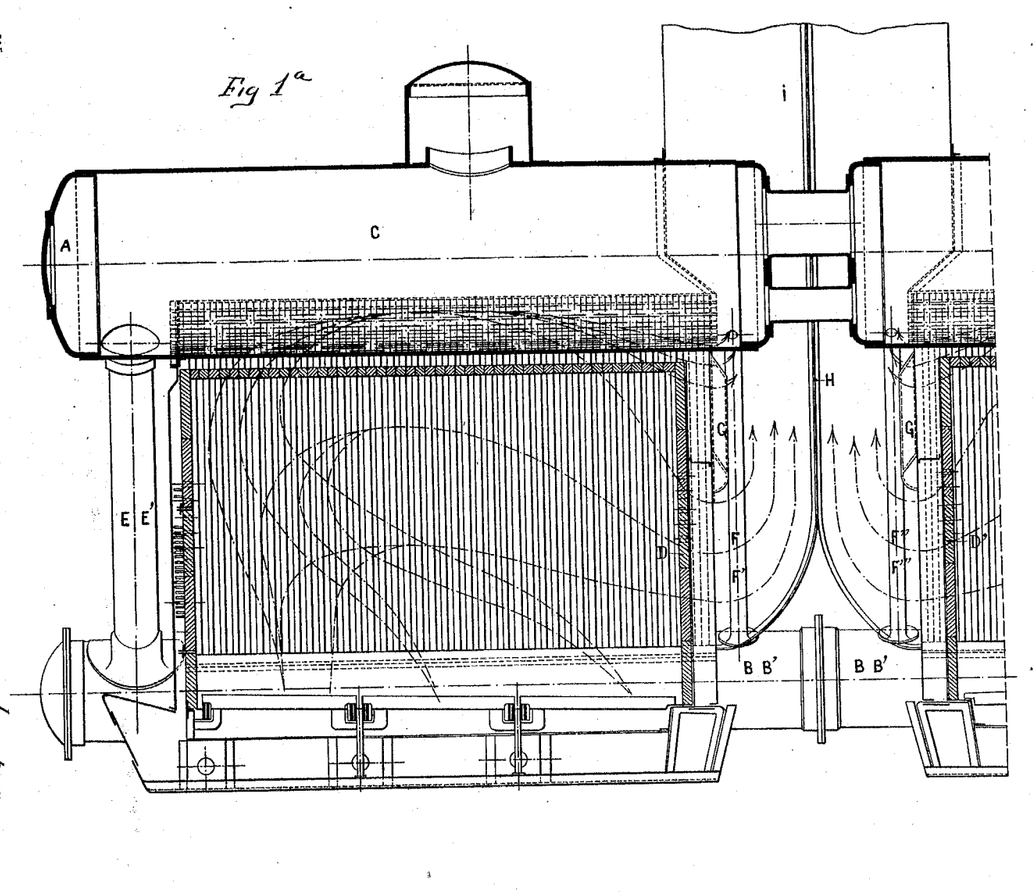

The upper central receiver C is preferably formed in two parts, as shown in Fig. 1, communicating with each other by one or more tubes or pipes, so as to offer a small resistance to the passage of the gases and to reduce the motion of the water in said upper receiver in a longitudinal direction. The said motion of the water can be further diminished both in the upper receiver and the lower receivers by means of horizontal screens or plates not water-tight. The steam may be taken off either from one part of the two upper receivers, which constitute when connected one main upper receiver, or from each of the two parts. In the first case the junction-pipes, which form the communication for the steam between the two said parts of the receiver, must be of sufficient size to prevent the existence of any appreciable difference in pressure and level between the two said parts. The feed-water is preferably supplied to each of the generators, so as to secure a uniform production of steam.

The apparatus is preferably constructed to be readily separated when desired into two parts longitudinally, so as to facilitate its transport and erection.

Figure 4:
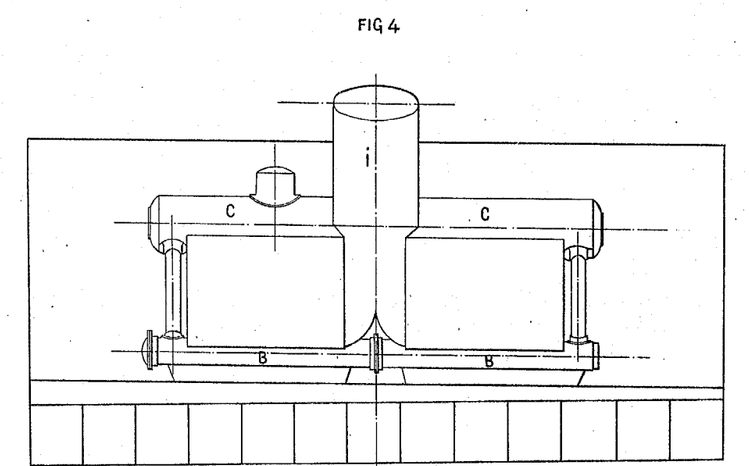
Figure 5:
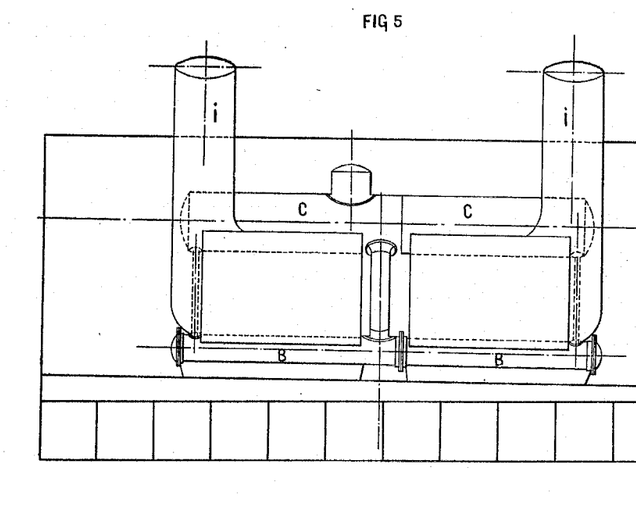
Figure 6:
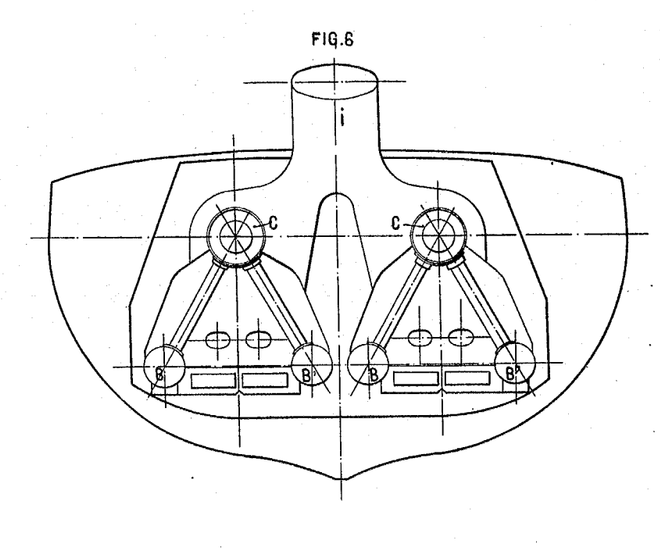

When there are two steam-generators of the new type in the width of the boat with receivers parallel to the longitudinal axis of the boat, the chimneys of the two generators are united according to this invention so as to form one. Figs. 4, 5, and 6 show two generators so arranged, Fig. 4 being a longitudinal elevation of generators of the first type; Fig. 5, a longitudinal elevation of generators of the second type—that is to say, generators in which the products of combustion are caused to return to the chimneys situated in the front portion of the said generators; and Fig. 6 is a transverse view common to both types of generators. The various parts of the said generators are similar to those which we have already described with reference to Figs. 1, 2, and 3, and by reference to these figures their operation will be readily understood.

Figure 7:
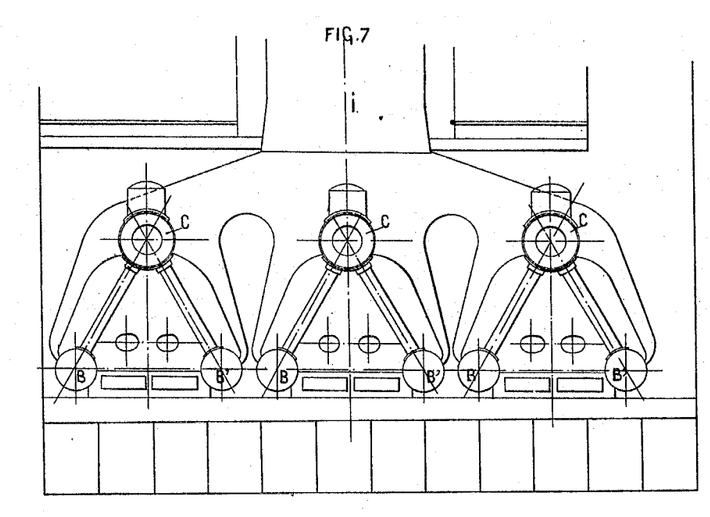
Figure 8:
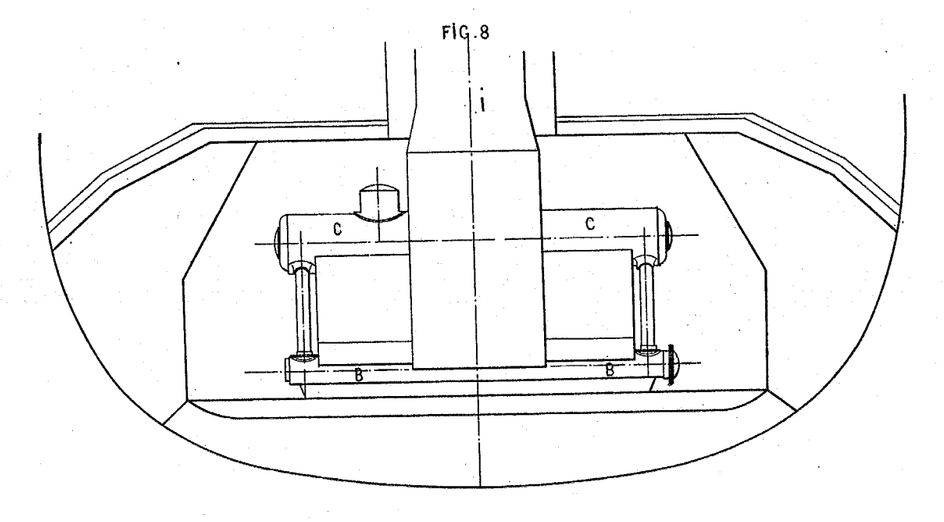
Figure 9:
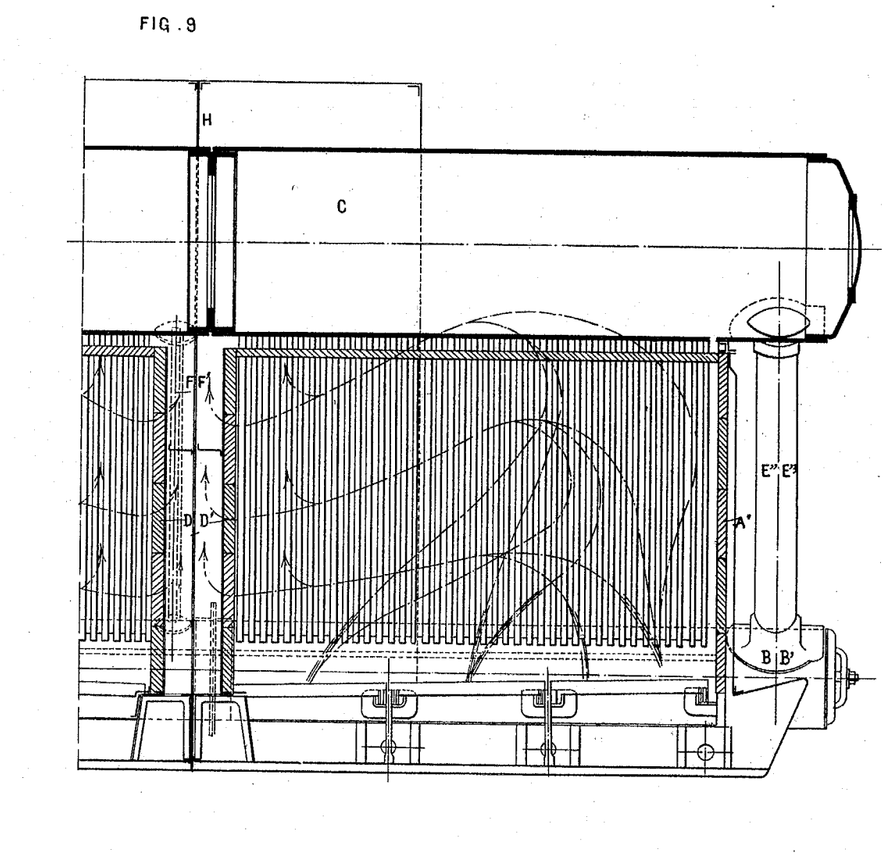
Figure 10:
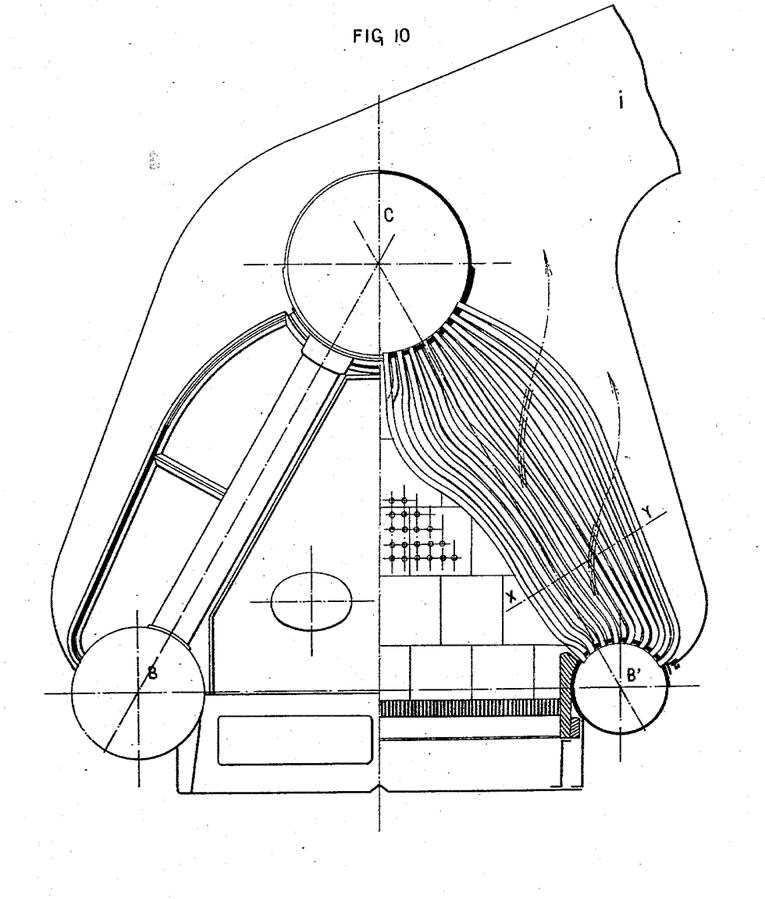
Figure 11:
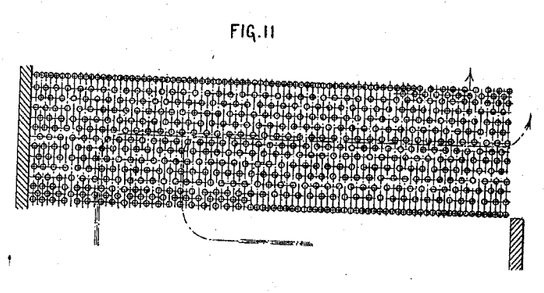

When the vessel is sufficiently broad in its beam, generators constructed according to this invention may be arranged therein so that their longitudinal axis be at right angles to the axis of the vessel, the stoke-holes being situated longitudinally on both sides the vessel. To facilitate such an installation which presents several advantages chiefly in connection with the service of the coal-bunkers and the arrangement of the chimneys, the length of the said generators may be reduced by dispensing with the smoke-boxes separated by the plate H, as shown in Fig. 1, and causing the heated products of combustion to leave laterally near the bridges D D'. A passage for the said gases is made by opening the screen formed by the two rows or series of the outer longitudinal heating-tubes, the said passage starting from the said bridges and extending through a certain length toward the fronts of the generators. This arrangement is illustrated in Figs. 7 and 8 of the accompanying drawings, Fig. 7 showing in end view three generators arranged across the axis of the vessel, and Fig. 8 showing a side view of such generators. Figs. 9, 9ª, 10, and 11 illustrate, on a larger scale, one of these generators. Fig. 9 is a vertical longitudinal section of the said generator, taken along the axis thereof. Fig. 10 shows the said generator half in front elevation and half in cross-section; and Fig. 11 is a longitudinal section taken on the line X V, Fig. 10, of the water-tubes.

Figure 2:
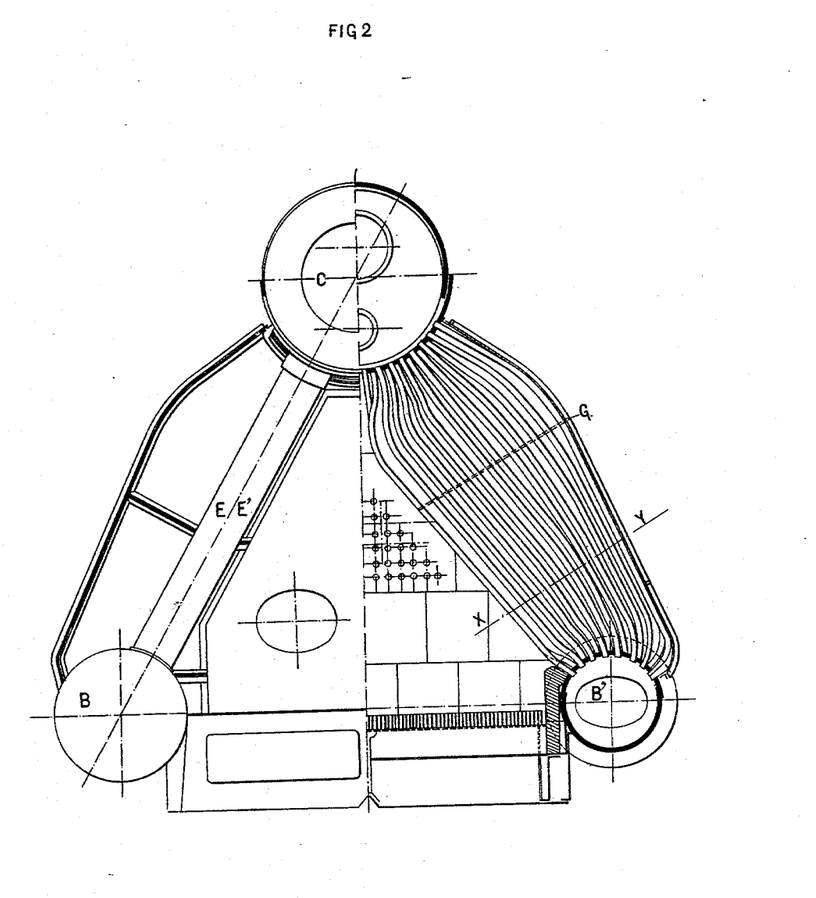
Fig. 2 shows the said generator half in front elevation and half in cross-section.
Figure 3:
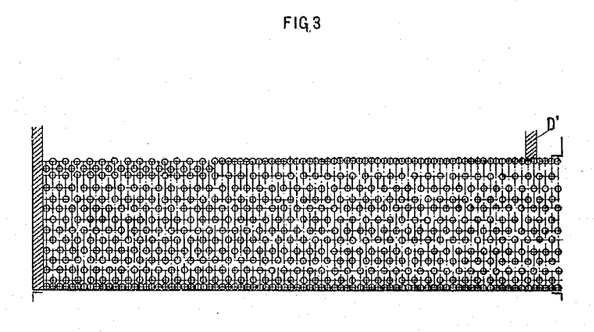
Fig. 3 is a longitudinal section taken on the line X Y, Fig. 2, of the water-tubes.

The letters of reference have the same meaning as in Figs. 1, 2, and 3.

This invention is not limited to the precise details described and illustrated in the drawings, the various parts being capable of modification to suit the requirements of particular installations.

We claim—

In a multitubular steam generator, the combination with two generators of like character provided with distinct furnaces and united to form a single combined generator, of an upper central receiver constructed in two like parts arranged end to end and a contracted neck or necks joining said receivers whereby communication between the same is established, substantially as and for the purpose described.

In testimony whereof we have signed this specification in the presence of two subscribing witnesses.

JACQUES AUGUSTIN NORMAND.
PIERRE SIGAUDY.

Witnesses:
ALBERT DIQUET,
V. L. MAIQUENT.